(12) United States Patent
Collin

(10) Patent No.: US 11,758,075 B2
(45) Date of Patent: Sep. 12, 2023

(54) FRAME RATE SYNCHRONIZATION

(71) Applicant: Dualitas Ltd, Milton Keynes (GB)

(72) Inventor: Stig Mikael Collin, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 218 days.

(21) Appl. No.: 17/246,402

(22) Filed: Apr. 30, 2021

(65) Prior Publication Data
US 2021/0400169 A1  Dec. 23, 2021

(30) Foreign Application Priority Data
Jun. 18, 2020 (GB) .................................. 2009298

(51) Int. Cl.
| | |
|---|---|
| *H04N 5/04* | (2006.01) |
| *G03H 1/00* | (2006.01) |
| *G03H 1/22* | (2006.01) |
| *H04N 9/31* | (2006.01) |
| *H04L 65/61* | (2022.01) |

(52) U.S. Cl.
CPC ............ *H04N 5/04* (2013.01); *G03H 1/0005* (2013.01); *G03H 1/2205* (2013.01); *G03H 1/2294* (2013.01); *H04N 9/3179* (2013.01); *G03H 2001/0088* (2013.01); *G03H 2001/2231* (2013.01); *G03H 2225/22* (2013.01); *H04L 65/61* (2022.05)

(58) Field of Classification Search
CPC .... H04N 5/04; H04N 21/4302; H04N 21/242; H04N 21/4305; H04N 7/56; H04N 13/398; H04N 13/363; G03H 1/0005; G03H 1/2294; G03H 2001/0088
See application file for complete search history.

(56) References Cited

U.S. PATENT DOCUMENTS

| | | | | |
|---|---|---|---|---|
| 8,254,755 B2* | 8/2012 | Miceli | ................ | H04N 5/772 725/148 |
| 9,905,199 B2* | 2/2018 | Liu | ................... | G09G 5/12 |
| 10,019,951 B2* | 7/2018 | Nakajima | ............ | G09G 3/2025 |
| 10,380,968 B2* | 8/2019 | Zhang | ................. | G09G 5/12 |
| 10,389,920 B2* | 8/2019 | Shiohara | ............... | H04N 23/90 |
| 11,457,173 B2* | 9/2022 | Fan | ...................... | H04N 7/013 |

(Continued)

FOREIGN PATENT DOCUMENTS

CN      111199697      5/2020

*Primary Examiner* — Boubacar Abdou Tchoussou
(74) *Attorney, Agent, or Firm* — McDonnell Boehnen Hulbert & Berghoff LLP

(57) ABSTRACT

A display system arranged to receive a video stream of frames for display. The frame rate of the video stream is defined by a first clock signal comprising a plurality of first clock reset signals (between frames). A subframe rate of the display system is defined by a second clock signal comprising a plurality of second clock reset signals (between subframes). The second clock reset signals define n subframes for each frame of the video stream. That is, the subframe rate of the display system is n times faster than the frame rate of the video stream. The display system is arranged so that duration of every nth second clock reset signal is different to the duration of the other second clock reset signals such that synchronization between frames of the video stream and subframes of the display device is maintained.

17 Claims, 4 Drawing Sheets

(56) References Cited

U.S. PATENT DOCUMENTS

| | | | |
|---|---|---|---|
| 2012/0044252 A1* | 2/2012 | Kamimura | G09G 5/006 |
| | | | 345/530 |
| 2014/0192173 A1* | 7/2014 | Yu | G03B 35/18 |
| | | | 348/55 |
| 2014/0306969 A1* | 10/2014 | Tang | G09G 5/12 |
| | | | 345/520 |
| 2016/0066000 A1 | 3/2016 | Cunningham et al. | |
| 2017/0237882 A1* | 8/2017 | Shiohara | H04N 5/04 |
| | | | 348/148 |
| 2019/0162950 A1 | 5/2019 | Lapstun | |
| 2021/0072379 A1* | 3/2021 | Christmas | G01S 7/4863 |
| 2021/0266495 A1* | 8/2021 | Fan | G11B 27/031 |
| 2022/0191444 A1* | 6/2022 | Nakagoshi | H04N 23/00 |
| 2022/0279149 A1* | 9/2022 | Ma | H04N 5/765 |

* cited by examiner

FRAME RATE SYNCHRONIZATION

CROSS REFERENCE TO RELATED APPLICATION

The present application is a non-provisional patent application claiming priority to United Kingdom Patent Application No. 2009298.7, filed Jun. 18, 2020, the contents of which are hereby incorporated by reference in their entirety.

FIELD

The present disclosure relates to frame rate synchronization. More specifically, the present disclosure relates to the synchronization of frames of an input image/video stream received at a first frame rate with frames of an output image/video stream provided to a display device at a second frame rate greater than the first frame rate. The frame rate synchronization technique may be used to synchronize an input video stream to a holographic projector having a high frame rate.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

In a conventional display system, a first subsystem (e.g. image source) may provide a video stream to a second subsystem (e.g. display device). Usually, the display device provides information to the image source about its preferential display settings and/or clock, and the image source adapts the video stream accordingly. The display device then simply processes and displays the image frames of the incoming video stream in accordance with its own clock (i.e. at its own frame refresh rate). Thus, the image source adapts to the frame rate of the display device.

However, it may be better to instead adapt the display device to the frame rate of the image source. In particular, data may be received as a video stream according to a predetermined protocol that defines acceptable ranges of parameters, such as the frame rate, transfer speed, data pay-load and defined synchronization signals. However, the display device may use a different protocol, typically a vendor-defined data transfer protocol, that defines different ranges of parameters for frame/refresh rate, transfer speed and so on. Accordingly, the first subsystem (image source) provides data frames using a first synchronization system or scheme at a first clock rate (frame rate) and the second subsystem (display device) processes and displays data frames using a second synchronization system or scheme at a second, different clock rate (frame/refresh rate).

For some display devices as described herein, the clock/frame rate of the second subsystem (display device) can be defined (e.g. by the vendor) to be fast—e.g. between 6 and 16 times faster—than the clock/frame rate at which the first subsystem (image source) provides data. Thus, each frame of the input image/video stream is displayed multiple times as a sequence of multiple consecutive subframes of the same frame. However, the end time of the last subframe of a frame processed and displayed on the display device requires synchronization with the time the subsequent frame is provided by the image source. Traditionally, this is handled by so-called "frame dropping". In a frame dropping scheme, the frame/clock rates of the image source and display device are allowed to operate in an asynchronous mode relative to each other, but the system detects when the two frame/clock rates are out of synchronization with each other by more than a threshold time (e.g. outside a defined time window). When this happens, the display device is typically unable to process and display the next frame from the image source for display as the next subframe. In accordance with the frame dropping scheme, the next frame transferred from the image source will be dropped entirely, and the current frame is displayed again. The dropping of the next frame enables synchronization to be restored. For example, by dropping every mth frame and, optionally, adding any necessary time delay every mth frame, synchronisation can be restored. Thereafter, the display of frames after the dropped frame can continue until the next frame drop is required. The time (or the number of frames) between two frame drops will depend on the interrelationship of the clocks/frame rates of the image source and display device.

Frame dropping is undesirable because some frames of a video sequence are not displayed at all to the viewer. Accordingly, improved techniques for frame rate synchronization are sought.

SUMMARY

Aspects of the present disclosure are defined in the appended independent claims.

There is provided a display system arranged to receive a video stream of frames for display. The frame rate of the video stream is defined by a first clock signal comprising a plurality of first clock reset signals (between frames). A subframe rate of the display system is defined by a second clock signal comprising a plurality of second clock reset signals (between subframes). The second clock reset signals define n subframes for each frame of the video stream. That is, the subframe rate of the display system is n times faster than the frame rate of the video stream. The display system is arranged so that duration of every nth second clock reset signal is different to the duration of the other second clock reset signals such that synchronization between frames of the video stream and subframes of the display system is maintained There is disclosed herein a display system arranged to receive a video stream of frames for display. The display system may comprise a display device such as a holographic display device (e.g. spatial light modulator). The video stream has a frame rate defined by a first clock signal (e.g. vertical synchronization or "V-Sync" signal). The first clock signal comprises a plurality of first clock reset signals (e.g. first V-sync reset signals). A next frame of the video stream is provided after each first clock reset signal. The display system has a subframe rate, wherein the subframe rate is greater than the frame rate. The subframe rate is defined by a second clock signal. The second clock signal comprises a plurality of second clock reset signals. A next subframe is displayed by the display device after each second clock reset signal. The second clock reset signals define n subframes for each frame of the video stream. That is, the subframe rate of the display system is n times faster than the frame rate of the video stream. Each frame of the video stream is displayed by the display device a plurality of times in a plurality of n subframes in accordance with the second clock signal.

In some embodiments, the n subframes of each frame are evenly spaced. In other words, the n display events (subframes) for each frame are evenly separated in time. It may be said that the duration of each of the (n−1) second clock reset signals between subframes of the same frame is constant. The display event of a last subframe of a frame and the display event of a first subframe of a next frame are differently separated in time. In particular, the duration of every nth second clock reset signal between subframes of different frames is different (e.g. increased). Thus, the separation in time between the last subframe of one frame and the first subframe of a next frame is different (e.g. increased).

As the skilled person will appreciate, a clock reset signal has a (finite) duration, t, which may be regarded as a reset time interval. During the reset time interval, the clock, and thus frame processing and output, is temporarily stopped or interrupted.

In accordance with the present disclosure, the time gap between the (processing and) display by the display device of the last subframe of a frame of the video stream and the first subframe of the next frame of the video stream is different to the time gap between the (processing and) display of successive subframes of the same frame of the video stream. In particular, the duration of every nth second clock reset signal is different to the duration of the (n−1) other second clock reset signals. It may be said that the reset time interval between a last subframe of a frame of the video stream and a first subframe of a next frame of the video stream is different to the reset time interval between subframes of the same frame of the video stream. Accordingly, continual synchronization between frames of the video stream and subframes of the display device can be achieved. It is unconventional in the art to use the duration of the clock reset signals (e.g. vertical reset signals) between frames to achieve synchronization between two different clocks. It is particularly unconventional to use clock reset signals of different length to address the problem of synchronization.

In some embodiments, each second clock reset signal comprises a data stall signal component and a data unstall signal component that define therebetween the duration of the second clock reset signal (i.e. signal stall time window). In other embodiments, each second clock reset signal of the plurality of second clock reset signals comprises a clock pulse having a pulse width, which defines the duration of the second clock reset signal. Other types of clock reset signal having a duration corresponding to a reset time interval are possible.

Each first/second clock signal (e.g. V-Sync signal) is a control signal or control line that includes periodic first/second clock reset signals at a periodic clock rate, each defining a frame reset. In embodiments, the first clock reset signals comprise clock pulses (V-Sync pulses) having a pulse width. In embodiments, the second clock reset signals comprise a data stall/unstall signal pair defining a signal stall time window. Each first/second clock reset signal indicates or signals when a complete image frame has been delivered and a next image frame can be received (e.g. in relation to a frame buffer). The pixel values of each image frame may be delivered in accordance with a raster scan or row-by-row scan of pixel array. Thus, the first/second clock reset signals effectively set a clock rate for a system or sub-system or protocol that it governs. In accordance with the present disclosure, the video stream on the one hand and the display system on the other hand have different clocks (e.g. periodicity of clock reset signals). It may be said that the video stream and display system have different clocks or different clock rates or different frame/frame refresh rates.

In accordance with the present disclosure, the second clock reset signal of the relatively fast-clocking display system is extended (relative to the other second clock reset signals) between image frames of a relatively slow-clocking video stream in order to perpetually maintain synchronization between the video stream and display system. In other words, in the second clock signal of the display system, the duration of the clock reset signal (e.g. time between data stall and data unstall signals or pulse width of clock pulse) between frames is extended in order to maintain synchronization between (frames of) the display system and video stream. Accordingly, conventional techniques such as frame dropping are not needed to bring a video stream and display system back into synchronization from time to time.

In some embodiments, each first clock reset signal of the plurality of first clock reset signals comprises a clock pulse (e.g. V-Sync pulse) having a pulse width. It may be said that each first clock reset signal is a pulse having a rising edge signaling the start of a clock reset and a falling edge signaling the end of a clock reset. For instance, the first clock reset signal of the first clock signal or control line has a rising edge signaling the start of a vertical reset and a falling edge signaling the end of a vertical reset.

In embodiments, each first clock reset signal starts and ends during a respective nth second clock reset signal. In particular, the timing of the first clock reset signal following a frame in the video stream coincides with (i.e. is synchronized with) the timing of the nth second clock reset signal following the display of n subframes corresponding to the frame by the display system. It may be said that each first clock reset signal (e.g. clock pulse) falls within the extended duration of the respective nth second clock reset signal (e.g. time window between data stall and data unstall signals or pulse width of a clock pulse).

In some embodiments, the display system displays n subframes corresponding to each frame of the video stream. In particular, following each first clock reset signal indicating the start of a new image frame of the video signal, the display device displays n subframes thereof defined by (n−1) second clock reset signals. In examples, the system displays n subframes corresponding to every frame of the video stream, such that there is no frame/subframe dropping.

In embodiments, the extended duration of the second clock reset signal (e.g. time window between data stall and data unstall signals or pulse width of a clock pulse) is such that the maximum number of subframes are defined during each frame.

In some implementations, the duration of each subframe displayed by the display system is constant. The plurality of n subframes of each frame are evenly spaced in time. In particular, the other second clock reset signals during the display of each frame have the same (non-extended) duration.

In some examples, the number of subframes per frame, n, is an integer >1 such as 1<n<13 or 3<n<9. It may be said that the subframe/refresh rate of the display device is between one and three times, optionally between three and nine times, the frame rate of the video stream.

The first clock signal or control line may be at a constant level between first clock reset signals. The second clock signal or control line may be at a constant level between second clock reset signals The term "subframe" is used with reference to the frames of the display system because the frame rate (or refresh rate) of the display system is greater than the frame rate of the video stream. The frame rate of the video stream may be 60 Hz. In other words, the video stream delivers image frames at a rate of 60 frames per second ("FPS"). The frame rate or refresh rate of the display system may be more than 200 Hz. In other words, the display system displays image frames at a rate of 200 FPS. The term "subframe" therefore reflects that each frame of the video stream may be displayed by the display system a plurality of times (i.e. as a plurality of sequential subframes) before the next frame of the video stream is received. The display system may comprise a display device and display driver. In some embodiments, the display device is a spatial light modulator, "SLM", such as a liquid crystal on silicon, "LCoS", spatial light modulator. The display driver may be an integrated circuit such as a field programmable gate array, "FPGA", or application-specific integrated circuit, "ASIC".

The term "clock signal" is used herein to refer to a synchronization signal of a synchronization system. The synchronization system may implement a defined protocol for the transfer of data frames and have a system clock. The clock signal is a control signal comprising periodic signals (e.g. clock pulses or equivalent) for synchronization in accordance with the system clock. The periodic signals may be clock reset signals. Thus, a "clock signal" may also be referred to as a "clock synchronization signal". In embodiments, at least one clock signal may be a vertical synchronization, "V-Sync", signal.

The terms "frame" and "subframe" are used herein, for simplicity, to refer to data representing an image frame or subframe. The term "video stream" similarly refers to a stream of image data representing a sequence of image frames.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level"

may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present disclosure is not restricted to the embodiments described in the following but extends to the full scope of the appended claims. That is, the present disclosure may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
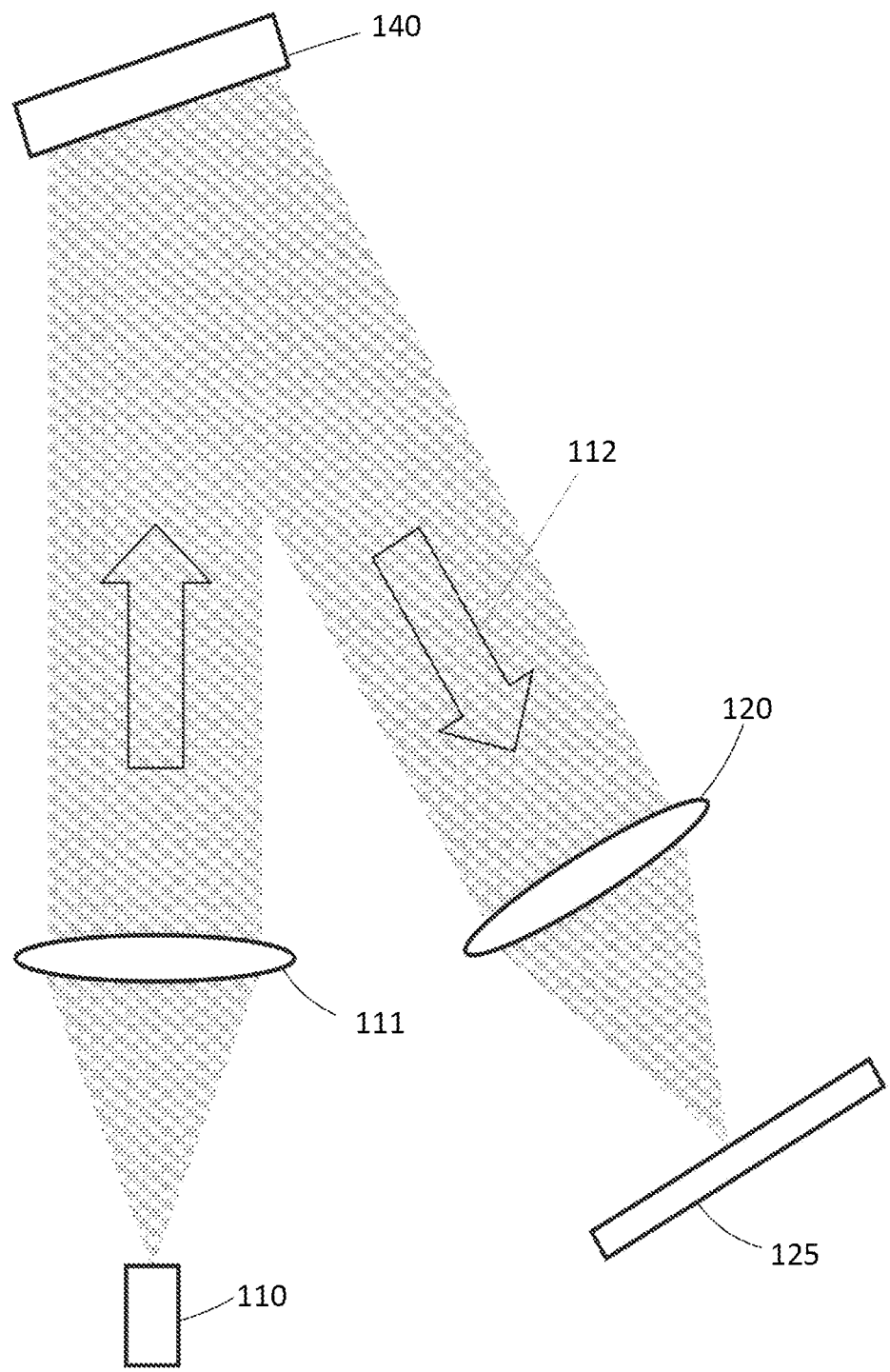
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

In some embodiments, there is provided a real-time engine arranged to receive image data and calculate holograms in real-time using the algorithm. In some embodiments, the image data is a video stream comprising a sequence of image frames. Holograms corresponding to image frames or the video stream may be calculated in real time or may be pre-calculated and stored in computer memory in advance, and recalled as needed for display on a SLM.

Some embodiments relate to Fourier holography and use Gerchberg-Saxton type algorithms for calculation of Fourier holograms. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 2:
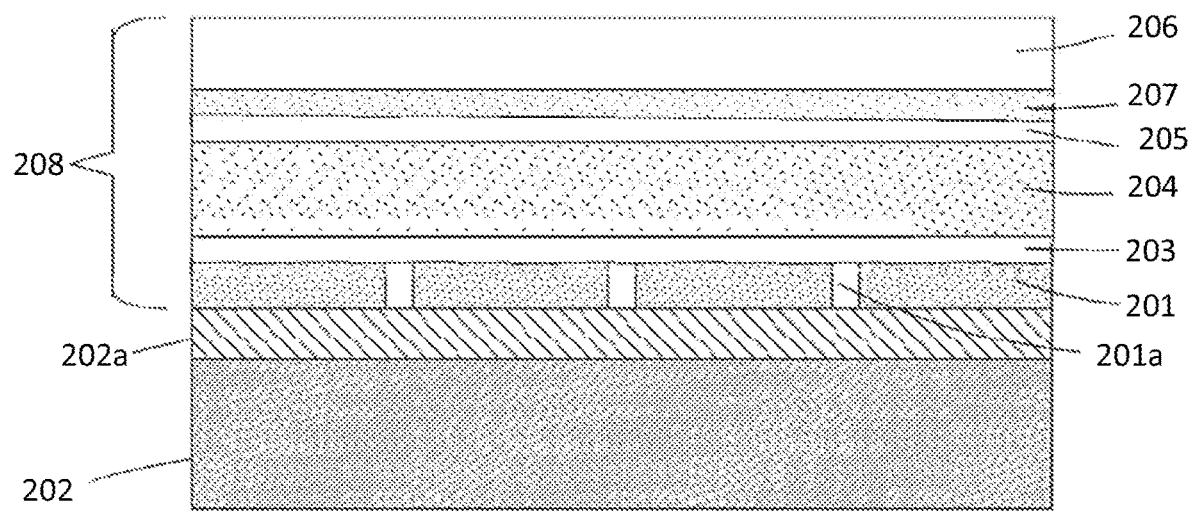
FIG. 2 is a schematic of a reflective LCOS SLM.

A suitable LCOS SLM is described below, by way of example only, with reference to FIG. 2. An LCOS device is formed using a single crystal silicon substrate 202. It has a 2D array of square planar aluminium electrodes 201, spaced apart by a gap 201a, arranged on the upper surface of the substrate. Each of the electrodes 201 can be addressed via circuitry 202a buried in the substrate 202. Each of the electrodes forms a respective planar mirror. An alignment layer 203 is disposed on the array of electrodes, and a liquid crystal layer 204 is disposed on the alignment layer 203. A second alignment layer 205 is disposed on the planar transparent layer 206, e.g. of glass. A single transparent electrode 207 e.g. of ITO is disposed between the transparent layer 206 and the second alignment layer 205.

Each of the square electrodes 201 defines, together with the overlying region of the transparent electrode 207 and the intervening liquid crystal material, a controllable phase-modulating element 208, often referred to as a pixel. The effective pixel area, or fill factor, is the percentage of the total pixel which is optically active, taking into account the space between pixels 201a. By control of the voltage applied to each electrode 201 with respect to the transparent electrode 207, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Holographic Display System—System Diagram

Figure 3:
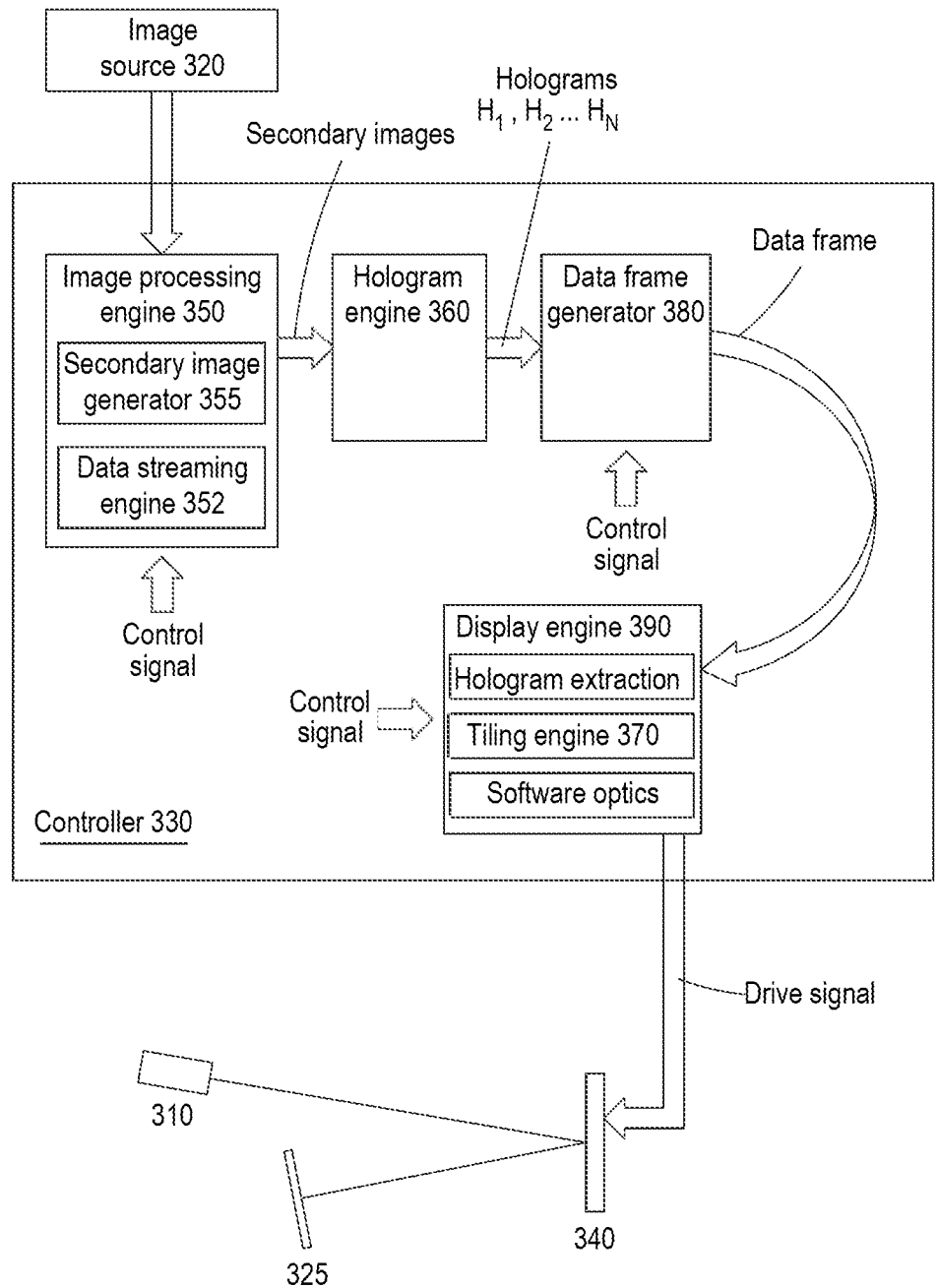
FIG. 3 is a block diagram of a holographic display system in accordance with embodiments.

FIG. 3 is a schematic showing a holographic display system in accordance with embodiments. A system includes a holographic projector comprising an SLM 340, a light source 310 and a replay plane 325, comprising a light receiving surface such as a screen of diffuser. In particular, SLM 340 is arranged to display holograms received from a controller 330. In operation, light source 310 illuminates the hologram displayed on SLM 340 and a holographic reconstruction is formed in a replay field on a replay plane 325. Controller 330 receives one or more images from an image source 320. For example, image source 320 may be an image capture device such as a video camera arranged to capture a video sequence of moving images or image frames. Image source 320 is arranged to provide a video stream of image frames to controller 330 in accordance with a corresponding data transfer protocol. As described further below, image source 320 may comprise a first synchronization system or scheme (e.g. first data transfer protocol) for controlling the rate of image frames provided in the video stream in accordance with a first clock rate (clock frequency) defined by the system clock.

Controller 330 comprises image processing engine 350, hologram engine 360, data frame generator 380 and display engine 390. Image processing engine 350 comprises a data streaming engine 352 arranged to receive each image frame of the video stream, in sequence, and provide synchronized data streams. In the illustrated embodiment, image processing engine 350 includes an optional secondary image generator 355 arranged to generate a plurality of secondary image frames representing the received image frame, based on a control signal. Image processing engine 350 passes the image frames (optionally the plurality of secondary image frames) to hologram engine 360. In some implementations, image processing engine 350 may stream pixel values of the frames to hologram engine 360 in real time.

Hologram engine 360 is arranged to determine a hologram corresponding to each frame received from image processing engine 350. Hologram engine 360 passes the plurality of holograms to data frame generator 380. Data frame generator 380 is arranged to generate a data frame (e.g. HDMI frame). In particular, data frame generator 380 generates a data frame comprising hologram data for each frame of the video stream (optionally comprising a plurality of holograms of the secondary image frames and pointers indicating the start of each hologram). Data frame generator 380 passes the data frame to display engine 390. Data frame generator 380 and display engine 390, in turn, may operate by data streaming.

Display engine 390 is arranged to display each hologram (corresponding to frames or secondary image frames) as a sequence of frame and subframes on SLM 340. Display engine 390 comprises hologram extractor 392, tiling engine 370 and software optics 394. Display engine 390 extracts a hologram from the data frame using hologram extractor 392 and tiles the hologram according to a tiling scheme generated by tiling engine 370, as known in the art. In particular, tiling engine 370 may receive a control signal to determine the tiling scheme, or may otherwise determine a tiling scheme for tiling based on the hologram. Display engine 390 may optionally add a phase ramp function (software grating function also called a software lens) using software optics 394, to translate the position of the replay field on the replay plane. Accordingly, for each hologram, display engine 390 is arranged to output a drive signal to SLM 340 to display each hologram of the plurality of holograms, in turn, as a subframe according to a corresponding tiling scheme.

Data frame generator 380 may generate data frames at the same rate as the video stream received from image source 320. Thus, each data frame may be provided by data frame generator 380 as a stream of data frames (comprising subframes) in accordance with a first clock/frame rate of a first synchronization system or scheme (e.g. first data transfer protocol). However, SLM 340 may display image frames at a faster frame rate (or refresh rate) in accordance with a second synchronization system or scheme (e.g. second data transfer protocol), as described herein. The scheme may use a frame rate synchronization technique in accordance with the present disclosure, as described further below, to provide a stream of subframes to SLM 340 in accordance a required faster subframe/clock rate (e.g. as defined by second data transfer protocol).

As the skilled person will appreciate, the above-described features of controller 330 may be implemented in software, firmware or hardware, and any combination thereof.

Frame Rate Synchronization

A holographic display system, such as a holographic projector, may be provided using the system described above. In particular, the holographic display system may display a sequence of holograms corresponding to frames of a video stream on a spatial light modulator and illuminate the spatial light modulator to form holographic reconstructions thereof on a replay plane for projection and/or display. Thus, a sequence of holographic images is displayed to a viewer in accordance with the video stream.

As described above, in holographic display systems, it is often necessary to adapt the display device—the spatial light modulator (or equivalent) and/or display driver—to the frame rate of an image source. For instance, image data may be received from a camera or other image source as a video stream, in accordance with a defined data transfer protocol, typically a video protocol or standard such as HDMI. Thus, data is received by the holographic projector as a video stream according to a predefined data transfer protocol that defines acceptable ranges of parameters, such as frame rate, transfer speed, data pay-load and defined synchronization signals. The controller of the holographic projector calculates a hologram representing each frame of the video stream from the image source, and generates a sequence of data frames at the same frame rate as the video stream. Accordingly, the image source provides a video stream of data frames using a first synchronization system or scheme at a first clock/frame rate. However, the display device (more specifically, the drive engine of the display device) uses a second synchronization system or scheme at a second, different clock rate (subframe/refresh rate) to display a plurality of subframes in each data frame. For instance, image data may need to be provided to the SLM in accordance with a vendor-defined data transfer protocol that defines acceptable ranges of parameters, such as frame/refresh rate, transfer speed, data pay-load and defined synchronization signals, that are different from those defined by the first data transfer protocol. Typically, the frame/refresh rate is faster than the frame rate of a video stream.

Figure 4:
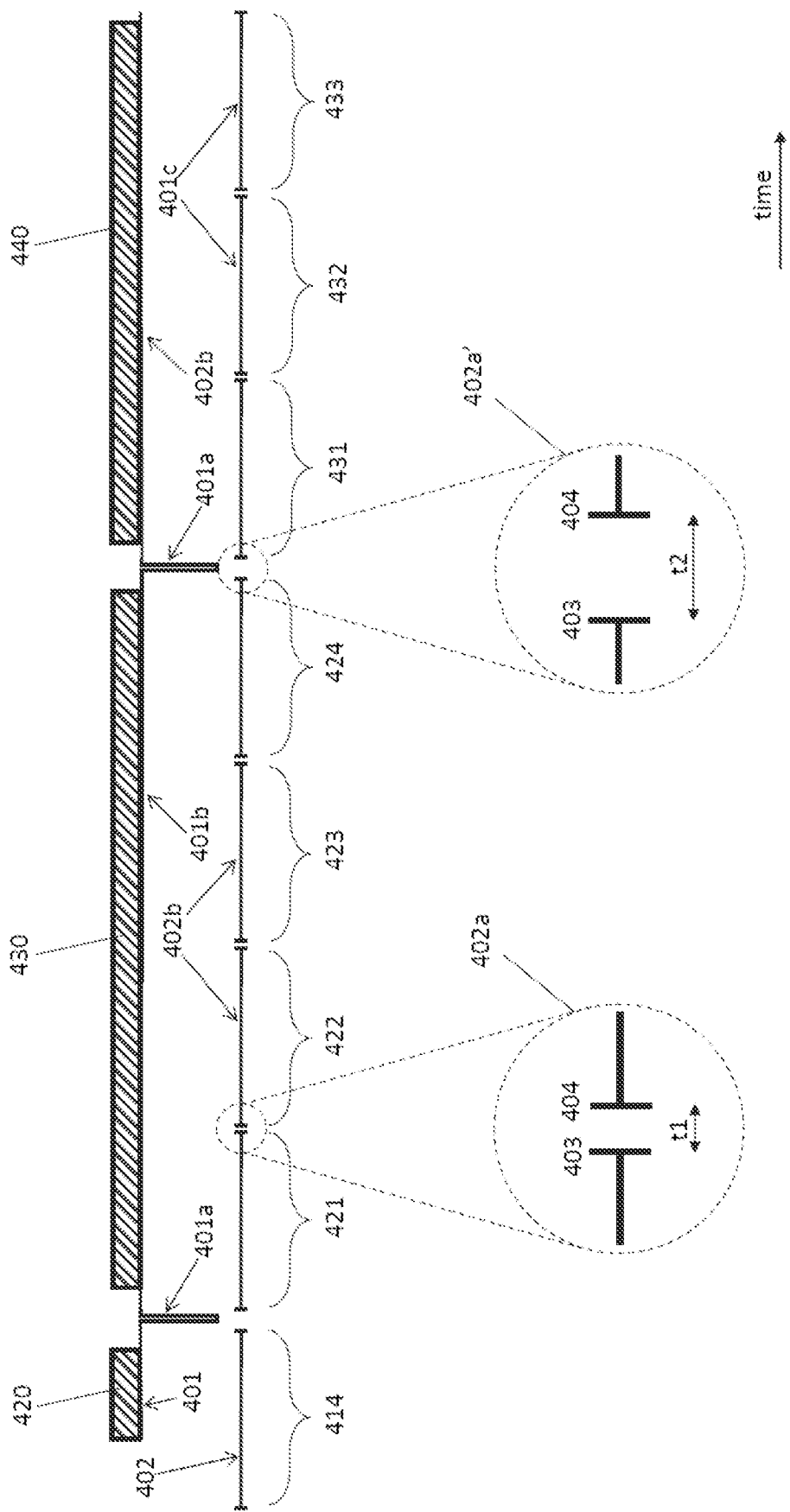
FIG. 4 shows a timing diagram of an example frame rate synchronization technique in accordance with embodiments.

FIG. 4 shows a timing diagram of an example frame rate synchronization technique in accordance with embodiments. In particular, the example technique synchronizes frames of a video stream having a first clock/frame rate (e.g. first data transfer protocol) with subframes displayed by a display device (e.g. spatial light modulator) having a second clock/subframe rate (or refresh rate) that is faster than the first clock/frame rate (e.g. second data transfer protocol).

In particular, FIG. 4 shows a first clock signal 401 that controls the rate of image frames 420, 430, 440 of a video stream at a first clock/frame rate of a first synchronization system or scheme (e.g. first data transfer protocol). In particular, the first clock signal 401 includes a plurality of first clock reset signals 401a, at periodic first time intervals 401b in accordance with the first clock rate (clock frequency) of the first synchronization system or scheme. Each image frame 420, 430, 440 is provided in the video stream during a constant time interval 401b between two consecutive clock reset signals 401a defined by the first clock rate/frequency. It may be said that the duration of each frame in the video stream is constant. Thus, the frame rate of image frames in the video stream (which may be measured in Hertz or frames per second) generally corresponds to the clock rate defined by the clock reset signals 401a. In the illustrated example, first clock signal 401 is continuous at a first level during first time intervals 401b (i.e. during the transfer of frames). Each periodic clock reset signal 401a is a clock pulse at a second level, lower than the first level, defined between a rising edge and a falling edge thereof. In particular, the rising edge of a clock pulse signals the start of the clock reset and the falling edge signals the end of the clock reset. In some embodiments, the first synchronization system or scheme may be a so-called vertical synchronization, "V-Sync", system or scheme of a conventional video stream in (e.g. HDMI video stream), and the clock reset signals 401a comprise vertical reset signals/pulses ("V-Sync pulses"), as generally known in the art. The video stream of image frames 420, 430, 440 may be received from an image source for display by a holographic display device as described herein.

FIG. 4 further shows a second clock signal 402 that controls the rate of image frames provided for display in accordance with a data transfer protocol, including a refresh rate, of the display device. In particular, second clock signal 402 controls a stream of image frames 414, 421, 422 ... 433 at a second clock/frame rate of a second synchronization system or scheme. The second clock/frame rate of the second synchronization system is n times faster than the first clock/frame rate of the first synchronisation system. Thus, a frame rate increase is required to adapt the frame data of the video stream to the faster frame/refresh rate of the display device. Accordingly, in order to achieve the required frame rate increase, each received image frame 420, 430, 440 of the video stream is displayed by the display device a plurality of n times, in particular as a plurality of n subframes. In some embodiments, the second synchronization system or scheme may be a faster synchronization system or scheme associated with a controller of a spatial light modulator (e.g. relatively fast vendor-defined data transfer protocol associated with an FPGA controller/LCoS SLM, as described herein).

Second clock signal 402 includes a plurality of (subframe) second clock reset signals 402a at periodic second time intervals 402b in accordance with the second clock rate (clock frequency) of the second synchronization system or scheme (e.g. second data transfer protocol). For example, as shown in FIG. 4, in response to first clock reset signal 401a after frame 420 of video stream, a plurality of four subframes 421, 422, 423 and 424 corresponding to frame 420 are provided for display in accordance with the second synchronization system or scheme. Thus, in the illustrated example n=4. Each subframe 421, 422, 423, 424 is provided for display during a constant second time interval 402b between two consecutive second clock reset signals 402a defined by the second clock rate/frequency. It may be said that the duration of display of each subframe (subframe display event) is constant. In accordance with the frame rate synchronization technique, every frame of the video stream is displayed as n subframes (e.g. 4 subframes in the example) of the display device. In particular, no frame (or subframe) dropping is required to achieve the required synchronization.

In accordance with the present disclosure, the second clock reset signal 402a is extended, after completion of data transfer of a sequence of n subframes corresponding to a frame for display. As shown by magnified illustration in FIG. 4, the duration t2 of every nth second clock reset signal 402a' is extended to be longer than the duration t1 of the other second clock reset signals 402a. Each first clock reset signal 401a is synchronised with a respective nth second clock reset signal 402a'. Thus, extended second clock reset signals 402a' of longer duration t2 are provided between subframes of different frames (i.e. a last subframe of one frame and a first subframe of the next frame), and the other second clock reset signals 402a of shorter duration t1 are provided between subframes of the same frame. It may be said that the reset time interval t2 of second clock reset signals 402a' between a last subframe corresponding to a frame of the video stream and a first subframe corresponding to a next frame of the video stream is greater than the reset time interval t1 of second clock reset signals 402a between subframes of the same frame of the video stream. In the illustrated example, all second clock reset signals 402a provided between subframes of the same frame has the same duration t1. This ensures that the subframes of each frame are evenly spaced in time.

In the illustrated embodiment, the second clock signal 402 is at a constant signal level during second time intervals 402b (during the (processing and) transfer of subframes). Second clock reset signals 402a, 402a' each comprise a data stall signal component and a data unstall signal component defining a data stall time window or simply "stall time window". In particular, the stall signal component interrupts or stops the second clock signal 402 and the unstall signal component continues or restarts the second clock signal 402. As the skilled person will appreciate, in other embodiments the second clock reset signals may each comprise a clock pulse having a duration defined by the pulse width, in which the rising and falling edges of the pulse define a time window thereof. As described herein, a stall time window or a pulse width may be regarded as a reset time interval of the clock reset signal.

To achieve synchronization between frames of the video stream and corresponding displayed subframes, the first clock reset signal 401a should fall entirely within the time window defined by the corresponding second clock reset signal 402a'. Thus, each first clock reset signal 401a starts and ends during a respective nth second clock reset signal 402a'.

It may be said that each first clock reset signal 401a should coincide with, or be synchronised with, a second clock reset signal 402a'. According, extending the duration of the time window defined by every nth second clock reset signal provided between subframes of different frames, enables synchronisation with a first clock reset signal 401a.

In some embodiments, the longer duration of every nth second clock reset signal may be achieved by keeping the duration of the (n−1) other second clock reset signals as close as possible to the normal duration defined by the parameters of the (second) data transfer protocol, and compensating for the longer duration by making the periodicity (second clock rate/frequency) slightly faster—but within the parameters of the (second data transfer protocol)—to thereby slightly shorten the subframe duration (for all subframes). The extended duration of every nth second clock reset signal may be chosen to correlate with the parameters of the (first) data transfer protocol of the received video stream, to ensure continual synchronization without the need for frame dropping. In particular, whilst a vendor-defined data transfer protocol for an SLM may be rigid in terms of limited ranges for some parameters, it is possible to adjust the duration of clock signals, as described herein, due to more flexible ranges. As the skilled person will appreciate, the extended duration and timing of the second clock reset signals should still be consistent with the definitions of the (second) data transfer protocol.

As indicated above, in the example illustrated in FIG. 4, the number of subframes per frame, n=4 (four). In other examples, n is an integer >1 such as 1<n<13 or 3<n<9. It may be said that the subframe/refresh rate of the display device is between one and three times, optionally between three and nine times, the frame rate of the video stream. In some applications, such as the holographic applications described herein, it is desirable to provide the maximum number n of subframes of each frame to the display to optimize the quality of the displayed image (holographic reconstruction). Accordingly, the duration of the second clock reset signals 402a and 402a' (and, optionally, also the second clock rate/frequency) may be selected to enable the maximum number of subframes per frame to be provided in the duration of a first time interval 401b (in accordance with the first clock rate/frequency). It may be said that second synchronization system may provide the maximum number of subframes per frame possible in the accordance with the first and second synchronization systems or schemes (e.g. defined first and second data transfer protocols) of the video stream and display device.

Accordingly, there is provided a display system method. The display system receives a video stream of image frames at a frame rate defined by a first clock signal. The first clock signal comprises a plurality of first clock reset signals. The display system processes and displays n evenly spaced subframes corresponding to each frame of the video stream at a subframe rate defined by a second clock signal. The second clock signal comprises a plurality of second clock reset signals. The display system changes (e.g. extends) the duration of every nth second clock reset signal, relative to the duration of the other second clock reset signals, such that synchronization between frames of the video stream and subframes of the display device system is maintained.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilized and system comprises physical blocks, such as baffles, arranged to restrict the propagation of the higher order replay fields through the system.

In embodiments, the holographic reconstruction is color. In some embodiments, an approach known as spatially-separated colors, "SSC", is used to provide color holographic reconstruction. In other embodiments, an approach known as frame sequential color, "FSC", is used.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A display system arranged to receive a video stream of frames for display, wherein:
   the frame rate of the video stream is defined by a first clock signal comprising a plurality of first clock reset signals, wherein each first clock reset signal comprises a start reset signal component and an end reset signal component that define therebetween a duration thereof; and
   a subframe rate of the display system is defined by a second clock signal comprising a plurality of second clock reset signals defining n subframes within each frame of the video stream, wherein n is an integer >1 and the n subframes of each frame are evenly spaced, wherein each second clock reset signal comprises a start reset signal component and an end reset signal component that define therebetween a duration thereof;
   wherein the duration of every nth second clock reset signal is different to the duration of the other second clock reset signals such that synchronization between frames of the video stream and subframes of the display system is maintained.

2. The display system as claimed in claim 1 wherein the duration of each first clock reset signal falls entirely within the duration of a respective nth second clock reset signal.

3. The display system as claimed in claim 1 wherein the duration of every nth second clock reset signal is greater than the duration of the other second clock reset signals.

4. The display system as claimed in claim 1 wherein each second clock reset signal comprises a stall signal component forming the start reset signal component and a unstall signal component forming the end reset signal component.

5. The display system as claimed in claim 1 wherein the duration of each subframe of the display system is constant.

6. The display system as claimed in claim 1 wherein every frame of the video stream comprises n subframes of the display system.

7. The display system as claimed in claim 1 wherein the durations of the second clock reset signals are such that the maximum number of subframes of the display system are defined during each frame of the video stream.

8. The display system as claimed in claim 1 wherein the duration of each of the other second clock reset signals is the same.

9. The display system as claimed in claim 1 wherein $1 < n < 13$.

10. The display system as claimed in claim 1 wherein 3<n<9.

11. The display system as claimed in claim 1 wherein each first clock reset signal is a pulse having a rising edge forming the start reset signal component signalling the start of a clock reset and a falling edge forming the end reset signal component signalling the end of a clock reset.

12. The display system as claimed in claim 1 wherein the first clock signal is a vertical synchronization, "V-Sync", signal.

13. The display system as claimed in claim 1 wherein the video stream is defined by a first data transfer protocol and the display system is configured to adapt one or more of the second clock signals and the number of subframes per frame n in order to maintain synchronization between the first clock signals of the video stream and the second clock signals of the subframes of the display system.

14. The display system as claimed in claim 1 comprising a holographic projector comprising a spatial light modulator and a display driver, wherein the second clock signal is associated with the display driver.

15. A head-up display comprising the display system of claim 1.

16. A head-mounted display comprising the display system of claim 1.

17. A display system method comprising:
receiving, by the display system, a video stream of image frames at a frame rate defined by a first clock signal comprising a plurality of first clock reset signals, wherein each first clock reset signal comprises a start reset signal component and an end reset signal component that define therebetween a duration thereof;
processing and displaying, by the display system, n evenly spaced subframes corresponding to each frame of the video stream at a subframe rate defined by a second clock signal comprising a plurality of second clock reset signals, wherein n is an integer >1 and wherein each second clock reset signal comprises a start reset signal component and an end reset signal component that define therebetween a duration thereof; and
changing, by the display system, the duration of every nth second clock reset signal relative to the duration of the other second clock reset signals such that synchronization between frames of the video stream and subframes of the display device system is maintained.

* * * * *